(No Model.)
P. M. WAY.
BELL RINGING ATTACHMENT FOR LOCOMOTIVES.
No. 292,712. Patented Jan. 29, 1884.
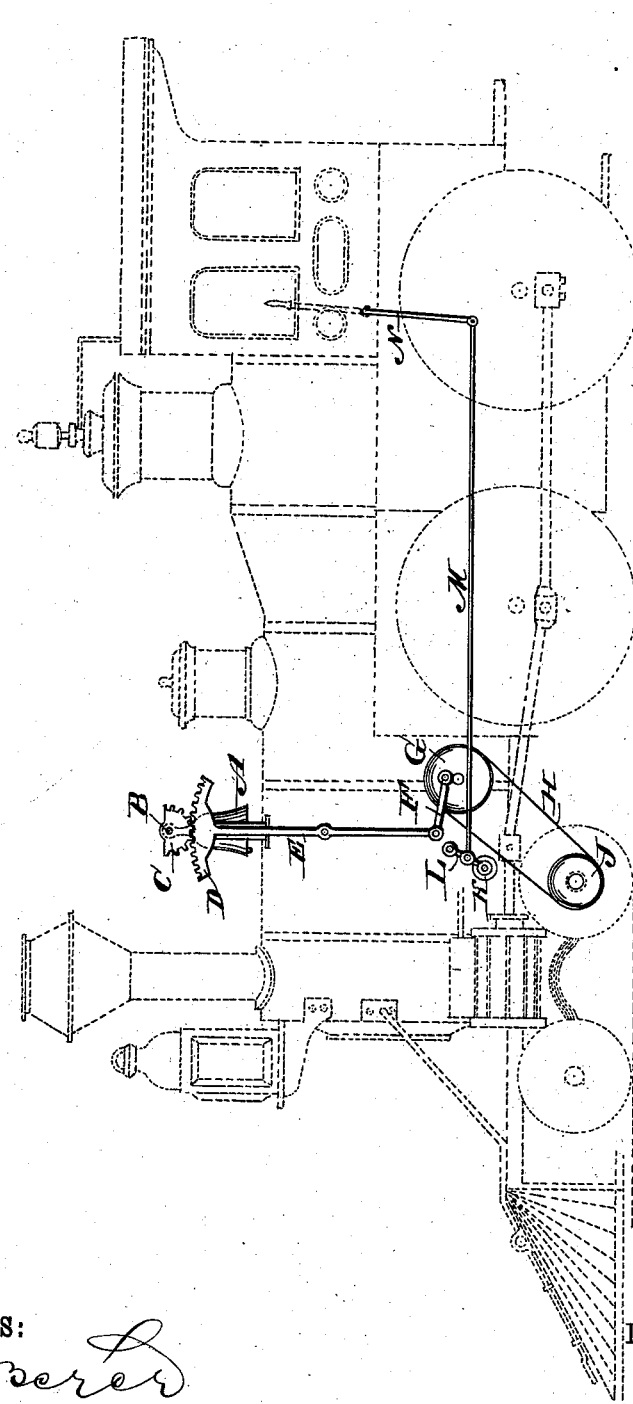
WITNESSES:
INVENTOR:
P. M. Way
BY Munn & Co
ATTORNEYS.

UNITED STATES PATENT OFFICE.

PENNOCK M. WAY, OF THURLOW, PENNSYLVANIA.

BELL-RINGING ATTACHMENT FOR LOCOMOTIVES.

SPECIFICATION forming part of Letters Patent No. 292,712, dated January 29, 1884.

Application filed June 12, 1883. (No model.)

*To all whom it may concern:*

Be it known that I, PENNOCK M. WAY, of Thurlow, in the county of Delaware and State of Pennsylvania, have invented a new and Improved Bell-Ringing Attachment for Locomotives, of which the following is a full, clear, and exact description.

The object of my invention is to provide a new attachment to locomotives for ringing the bell from one of the wheels or shafts of the locomotive, which ringing device can be thrown in and out of gear very easily, and rings the bell automatically as long as required.

Reference is to be had to the accompanying drawing, forming part of this specification, in which a longitudinal view of my improved bell-ringing device is shown.

The bell A is suspended from a journaled yoke or shaft, B, in the usual manner, on one end of which shaft or yoke a semicircular rack, C, is rigidly mounted, which engages with a segmental rack, D, formed on the upper end of an upright lever, E, pivoted to the side of the locomotive. A connecting-rod, F, is pivoted eccentrically on a grooved or flanged pulley wheel or disk G, and has its other end pivoted to the lower end of the lever E, so that if the pulley-disk is revolved the lower end of the lever E will be rocked. A belt, H, is passed over the pulley G, and over a pulley, J, on one of the front axles of the locomotive. A roller, K, is journaled in or pivoted to the swinging end of a short arm, L, pivoted to the side of the locomotive, which arm L is connected by a connecting-rod, M, with a lever, N, in the caboose. If the bell is to ring, the fireman or engineer swings the roller K against the belt H, whereby the same is made taut. The wheel G is revolved from the wheel J, and the wheel G rocks the lower end of the lever E, which in turn rocks the shaft or yoke from which the bell is suspended. The bell is rocked as long as the belt H is kept taut, and the bell rings rapidly or slowly, according to the speed of the locomotive. As the fireman need not pull the bell-rope, he has more time to attend to the fires, keep the cocks and other parts in the caboose in order, &c. The movement of the bell is not affected by any irregularities in the driving mechanism, as the power for operating the bell is taken from one of the front axles or wheels.

The above-described device can be applied on any locomotive. In case the locomotive is not provided with small wheels—for instance, as in switching-locomotives—an independent wheel must be attached to the locomotive for driving the belt. Any other suitable device different from that described for tightening the belt H may be provided.

Having thus described my invention, I claim as new and desire to secure by Letters Patent—

1. The combination, with a locomotive and its bell, of a rocking lever acting on the bell, a belt-pulley on one locomotive axle or wheel, a belt-pulley connected by a connecting-rod with the rocking lever, and a belt or analogous device for transmitting motion from the pulley on the wheel or axle to the pulley connected with the rocking lever, substantially as herein shown and described, and for the purpose set forth.

2. The combination, with a locomotive and its bell, of the semicircular rack C on the bell-yoke or bell-shaft, the working-lever E, the segmental rack D on the same, the connecting-rod F, the pulley G, the belt H, and the pulley J, substantially as herein shown and described, and for the purpose set forth.

3. The combination, with an axle, an upper roller, and a locomotive-bell, of a rocking lever adapted to swing the bell, a belt for operating the rocking lever from one of the locomotive wheels or axles, the belt-supporting mechanism, and a device for tightening the belt, substantially as herein shown and described, and for the purpose set forth.

4. The combination, with an axle, an upper roller, and a locomotive-bell, of a rocking lever adapted to swing the bell, a belt, H, for operating the rocking lever from one of the locomotive wheels or axles, the belt-supporting mechanism, the arm L, carrying the pulley or roller K, the connecting-rod M, and the lever N, substantially as herein shown and described, and for the purpose set forth.

PENNOCK M. WAY.

Witnesses:
ED. HARKINS,
J. E. TAYLOR, Jr.